US010922338B2

(12) United States Patent
Hu et al.

(10) Patent No.: US 10,922,338 B2
(45) Date of Patent: Feb. 16, 2021

(54) METHODS, SYSTEMS, NETWORKS, AND MEDIA FOR GENERATING LOCATION BASED CLUSTERS OF MERCHANTS BASED ON CONSUMER TRANSACTION ACTIVITY

(71) Applicant: MasterCard International Incorporated, Purchase, NY (US)

(72) Inventors: Po Hu, Norwalk, CT (US); Shen Xi Meng, Millwood, NY (US); Fuyuan Xiao, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 543 days.

(21) Appl. No.: 15/810,662

(22) Filed: Nov. 13, 2017

(65) Prior Publication Data
US 2019/0147469 A1    May 16, 2019

(51) Int. Cl.
*G06F 16/35* (2019.01)
*G06F 16/28* (2019.01)
*G06F 16/29* (2019.01)
*G06Q 30/02* (2012.01)

(52) U.S. Cl.
CPC ........... *G06F 16/29* (2019.01); *G06F 16/285* (2019.01); *G06F 16/353* (2019.01); *G06Q 30/0205* (2013.01)

(58) Field of Classification Search
CPC ... G06Q 30/0205; G06F 16/353; G06F 16/29; G06F 16/285
USPC ....................................................... 707/737
See application file for complete search history.

(56) References Cited

U.S. PATENT DOCUMENTS

| | | | | |
|---|---|---|---|---|
| 8,335,720 B2 * | 12/2012 | Juang | ................ | G06Q 30/0202 705/14.53 |
| 2007/0179836 A1 * | 8/2007 | Juang | ................ | G06O 30/0202 705/7.31 |
| 2013/0110625 A1 * | 5/2013 | Juang | ................ | G06O 30/0255 705/14.53 |
| 2015/0220999 A1 * | 8/2015 | Thornton | ........... | H04M 15/8011 705/14.66 |
| 2016/0048858 A1 * | 2/2016 | Bernard | ............ | G06Q 30/0205 705/7.34 |
| 2017/0148081 A1 * | 5/2017 | Chauhan | ............ | G06Q 30/0631 |

(Continued)

*Primary Examiner* — Phong H Nguyen
(74) *Attorney, Agent, or Firm* — Baker Botts L.L.P.

(57) ABSTRACT

An apparatus for generating merchant clusters based upon monitored consumer transaction activity can include a processor configured to communicate with a consumer transaction database. The processor can be configured to obtain transaction activity of consumers. The processor can be configured to generate a reference cluster based on the obtained transaction activity. The processor can be configured to generate at least one regional merchant cluster for each of a plurality of different geographic regions based on the obtained transaction activity. The processor can be configured to generate a cluster labeling scheme, for each of the different geographic regions, based on comparing each regional merchant cluster for that corresponding geographic region against the reference cluster. The processor can be configured to realign cluster labels for each regional merchant cluster for each of the different geographic regions based on the corresponding cluster labeling scheme generated for the corresponding geographic region.

20 Claims, 9 Drawing Sheets

(56) References Cited

U.S. PATENT DOCUMENTS

2017/0169469 A1\* 6/2017 Meng ................. G06Q 30/0255
2017/0300948 A1\* 10/2017 Chauhan ............ G06Q 30/0201

\* cited by examiner

| | Acct 1 | Acct 2 | Acct 3 | Acct 4 | Acct 5 | Acct 6 | Acct 7 | Acct 8 | Acct 9 | Acct 10 | Acct 11 | Acct 12 | Acct 13 | Acct 14 | Acct 15 |
|---|---|---|---|---|---|---|---|---|---|---|---|---|---|---|---|
| Store1 | 4 | 4 | 2 | 0 | 4 | 1 | 0 | 1 | 2 | 0 | 0 | 0 | 0 | 0 | 1 |
| Store2 | 4 | 5 | 6 | 5 | 7 | 0 | 0 | 3 | 3 | 2 | 1 | 1 | 1 | 3 | 2 |
| Store3 | 2 | 8 | 3 | 3 | 3 | 1 | 3 | 0 | 2 | 1 | 0 | 1 | 1 | 1 | 1 |
| Store4 | 3 | 2 | 0 | 3 | 4 | 0 | 1 | 1 | 0 | 1 | 1 | 2 | 2 | 0 | 0 |
| Store5 | 1 | 3 | 1 | 2 | 1 | 1 | 0 | 1 | 0 | 1 | 1 | 1 | 0 | 1 | 0 |
| Store6 | 1 | 1 | 0 | 3 | 2 | 2 | 1 | 2 | 4 | 3 | 2 | 0 | 1 | 2 | 1 |
| Store7 | 0 | 0 | 0 | 0 | 1 | 0 | 2 | 3 | 4 | 5 | 0 | 1 | 0 | 1 | 1 |
| Store8 | 0 | 0 | 0 | 1 | 1 | 3 | 2 | 2 | 3 | 3 | 1 | 0 | 1 | 3 | 1 |
| Store9 | 3 | 1 | 0 | 2 | 0 | 4 | 2 | 1 | 4 | 1 | 0 | 0 | 1 | 0 | 0 |
| Store10 | 0 | 1 | 0 | 1 | 0 | 1 | 1 | 1 | 2 | 3 | 2 | 0 | 1 | 3 | 0 |
| Store11 | 1 | 0 | 2 | 1 | 1 | 4 | 4 | 2 | 2 | 4 | 1 | 1 | 0 | 1 | 2 |
| Store12 | 0 | 0 | 2 | 1 | 2 | 6 | 3 | 5 | 2 | 7 | 1 | 0 | 0 | 2 | 1 |
| Store13 | 0 | 2 | 0 | 0 | 1 | 3 | 2 | 3 | 2 | 4 | 1 | 0 | 1 | 0 | 0 |
| Store14 | 0 | 1 | 0 | 0 | 1 | 2 | 3 | 1 | 3 | 0 | 2 | 2 | 1 | 3 | 2 |
| Store15 | 1 | 0 | 0 | 0 | 2 | 0 | 0 | 0 | 1 | 4 | 6 | 2 | 4 | 4 | 1 |
| Store16 | 2 | 0 | 0 | 0 | 1 | 0 | 0 | 0 | 1 | 0 | 2 | 3 | 1 | 8 | 4 |
| Store17 | 1 | 1 | 0 | 0 | 3 | 1 | 1 | 0 | 2 | 1 | 3 | 4 | 4 | 5 | 2 |
| Store18 | 2 | 0 | 0 | 0 | 1 | 0 | 1 | 1 | 3 | 0 | 1 | 1 | 5 | 3 | 6 |
| Store19 | 1 | 1 | 1 | 0 | 0 | 0 | 1 | 0 | 1 | 2 | 1 | 2 | 2 | 3 | 2 |
| Store20 | 1 | 0 | 2 | 0 | 0 | 0 | 1 | 0 | 0 | 0 | 4 | 6 | 3 | 1 | 2 |

400

450

Cluster Dendrogram dist.store
hclust (*, "complete")

| AGG ID List | Reference Cluster | Region 1 | | |
|---|---|---|---|---|
| | | Regional Cluster 1 | Regional Cluster 2 | Regional Cluster 3 |
| 1 | 3 | 2 | 2 | 1 |
| 2 | 3 | 2 | 1 | 1 |
| 3 | 3 | 0 | 2 | 1 |
| 4 | 2 | 3 | 3 | 2 |
| 5 | 2 | 3 | 3 | 2 |
| 6 | 1 | 1 | 2 | 3 |
| 7 | 1 | 2 | 1 | 3 |
| 8 | 1 | 1 | 2 | 3 |

| AGG ID List | Reference Cluster | Region 1 Regional Cluster 1 | Match |
|---|---|---|---|
| 1 | 3 | 2 | 0 |
| 2 | 3 | 2 | 0 |
| 3 | 3 | 0 | 0 |
| 4 | 2 | 3 | 0 |
| 5 | 2 | 3 | 0 |
| 6 | 1 | 1 | 1 |
| 7 | 1 | 2 | 0 |
| 8 | 1 | 1 | 1 |
| | | | 2 |

| Ref Region vector G |||| 
|---|---|---|---|
| AGG ID | Cluster=1 | Cluster=2 | Cluster=3 |
| 1 | 0 | 0 | 1 |
| 2 | 0 | 0 | 1 |
| 3 | 0 | 0 | 1 |
| 4 | 0 | 1 | 0 |
| 5 | 0 | 1 | 0 |
| 6 | 1 | 0 | 0 |
| 7 | 1 | 0 | 0 |
| 8 | 1 | 0 | 0 |

| Region 1 vector A |||| 
|---|---|---|---|
| AGG ID | Cluster=1 | Cluster=2 | Cluster=3 |
| 1 | 0 | 1 | 0 |
| 2 | 0 | 1 | 0 |
| 3 | 0 | 0 | 0 |
| 4 | 0 | 0 | 1 |
| 5 | 0 | 0 | 1 |
| 6 | 1 | 0 | 0 |
| 7 | 0 | 1 | 0 |
| 8 | 1 | 0 | 0 |

| | | Region 1 cluster A | | |
|---|---|---|---|---|
| | | 1 | 2 | 3 |
| Reference cluster G | 1 | 2 | 1 | 0 |
| | 2 | 0 | 0 | 2 |
| | 3 | 0 | 2 | 0 |

| AGG ID List | Ref Region | 1 | Match |
|---|---|---|---|
| 1 | 3 | 3 | 1 |
| 2 | 3 | 3 | 1 |
| 3 | 3 | 0 | 0 |
| 4 | 2 | 2 | 1 |
| 5 | 2 | 2 | 1 |
| 6 | 1 | 1 | 1 |
| 7 | 1 | 3 | 0 |
| 8 | 1 | 1 | 1 |

| AGG ID List | Region | | | | |
|---|---|---|---|---|---|
| | Ref Region | 1 | 2 | 3 | match |
| 1 | 3 | 3 | 3 | 3 | 3 |
| 2 | 3 | 3 | 1 | 3 | 2 |
| 3 | 3 | 0 | 3 | 3 | 2 |
| 4 | 2 | 2 | 2 | 2 | 3 |
| 5 | 2 | 2 | 2 | 2 | 3 |
| 6 | 1 | 1 | 3 | 1 | 2 |
| 7 | 1 | 3 | 1 | 1 | 2 |
| 8 | 1 | 1 | 3 | 1 | 2 |

19

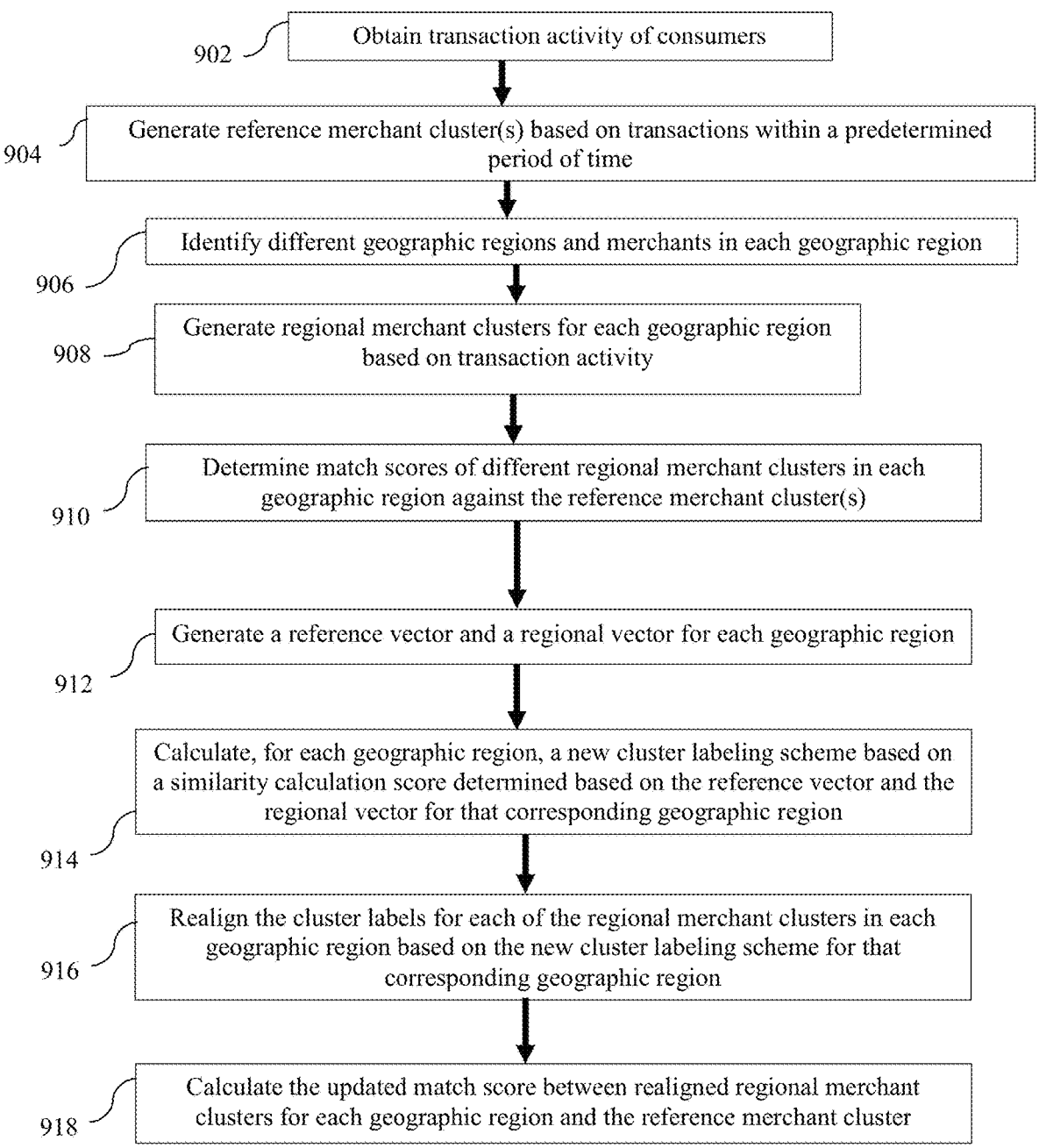

METHODS, SYSTEMS, NETWORKS, AND MEDIA FOR GENERATING LOCATION BASED CLUSTERS OF MERCHANTS BASED ON CONSUMER TRANSACTION ACTIVITY

BACKGROUND

The disclosed subject matter relates to methods, systems, networks, and media for generating location based merchant clusters based upon monitored consumer transaction activity.

With the availability of different forms of consumers' purchasing behavior, merchants, financial institutions, and advertisers are developing models to better target potential consumers. Currently, merchant classification and derived consumer behaviors are based on human knowledge about merchant type and/or merchant category without considering the impact of different consumers' shopping trends in different regions. Similarly, currently, merchant classification is often performed without factoring in consumers' cultural heritage and demographic information. Instead, currently, merchants are being classified according to the type of industry to which they belong (i.e., merchant category). For a geographically large and diverse country such as the United States of America, consumers in different geographic locations of the country and across different demographic distributions can span a wide distribution of financial situations, lifestyles, needs, and purchase behaviors. Accordingly, consumer shopping patterns can differ according to consumer purchasing power in different geographic regions. Furthermore, the availability of different types of merchants can also vary from location to location. Accordingly, attempting to generalize shopping patterns learnt from a global definition of a particular industry when applied to specific geographic regions fails to accurately provide actionable data since consumers' shopping preferences, cultural backgrounds, and patterns vary by geographic region. Current merchant clustering techniques fail to capture such local and/or regional differentiations and are not optimized to reflect such geographic differences in consumer shopping patterns and/or behaviors.

Accordingly, there exists a need to cluster merchants based on merchant location and consumer shopping patterns to better understand and influence consumers' shopping behavior.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, a computer-implemented method for generating location based merchant clusters based upon monitored consumer transaction activity is disclosed. The computer-implemented method can include obtaining, by a processor, transaction activity of consumers. The method can include generating, by the processor, a reference cluster based on the obtained transaction activity. The method can include generating, by the processor, at least one regional merchant cluster for each of a plurality of different geographic regions based on the obtained transaction activity. The method can include generating, by the processor, a cluster labeling scheme, for each of the plurality of different geographic regions, based on comparing each of the regional merchant clusters for that corresponding geographic region against the reference cluster. The method can include realigning, by the processor, cluster labels for each of the regional merchant clusters in each of the plurality of different geographic regions based on the corresponding cluster labeling scheme generated for the corresponding geographic region.

For purpose of illustration and not limitation, the method can include identifying, by the processor, different geographic regions and merchants in each of the different geographic regions. The merchants identified in each of the different geographic regions can be included, by the processor, in one or more corresponding regional merchant clusters for each identified geographic region.

For purpose of illustration and not limitation, the method can include determining, by the processor, match scores of different regional merchant clusters for each of the different geographic regions against the reference cluster. Comparing each regional merchant cluster against the reference cluster can include generating, by the processor, a reference vector and a regional vector for each of the different geographic regions. The regional vector can include match scores of the merchant clusters for each corresponding geographic region. Comparing each regional merchant cluster against the reference cluster also can include performing, by the processor, a dot product of the reference vector and the regional vector for each geographic region to generate a similarity matrix for each geographic region and determining, by the processor and from the similarity matrix, the cluster labeling scheme for each geographic region. The cluster labeling scheme can be determined by identifying, by the processor, the cluster labeling scheme that maximizes the dot product values in the similarity matrix.

For purpose of illustration and not limitation, the reference cluster can be a country-level merchant cluster generated based on transactions made by consumers within a defined time period and wherein the country-level merchant cluster serves as reference for the different regional merchant clusters to be normalized with respect to each other. Being normalized can further include realigning, by the processor, cluster labels for each of the different regional merchant clusters with respect to the reference cluster.

For purpose of illustration and not limitation, generating at least one regional merchant cluster for each of a plurality of different geographic regions can further include identifying, by the processor, a parameter affecting shopping behavior of consumers from the obtained transaction activity and generating, by the processor, different regional merchant clusters in each geographic region based on the identified parameter.

For purpose of illustration and not limitation, the method can include providing, by the processor and to a consumer, a recommendation of a first merchant at which to shop by determining from the obtained transaction history that the consumer has previously shopped at a second merchant that is a member of a regional merchant cluster comprising the first merchant and the second merchant.

For purpose of illustration and not limitation, generating at least one regional merchant cluster can include identifying, by the processor, a first merchant and a second merchant located within a geographic region such that one or more consumers have visited both the first and second merchant more than once.

In accordance with another aspect of the disclosed subject matter, an apparatus for generating merchant clusters based upon monitored consumer transaction activity is disclosed. The apparatus can include a processor configured to communicate with a consumer transaction database. The processor can be configured to obtain transaction activity of consumers. The processor can be configured to generate a reference cluster based on the obtained transaction activity. The processor can be configured to generate at least one regional merchant cluster for each of a plurality of different geographic regions based on the obtained transaction activity. The processor can be configured to generate a cluster labeling scheme, for each of the different geographic regions, based on comparing each regional merchant cluster for that corresponding geographic region against the reference cluster. The processor can be configured to realign cluster labels for each regional merchant cluster for each of the different geographic regions based on the corresponding cluster labeling scheme generated for the corresponding geographic region.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 3 is a diagram illustrating a table of transaction history data identifying the number of times each consumer has conducted transactions at a given merchant location according to an illustrative embodiment of the disclosed subject matter.

FIG. 5A is a table illustrating cluster labels being compared for different merchants clusters in different geographic regions against a reference merchant cluster according to an illustrative embodiment of the disclosed subject matter. FIG. 5B is a table illustrating the level of match of a particular merchant cluster for a given geographic region against that of a reference merchant cluster according to an illustrative embodiment of the disclosed subject matter.

FIG. 6A is a table illustrating a reference vector of a reference merchant cluster according to an illustrative embodiment of the disclosed subject matter. FIG. 6B is a table illustrating a vector of merchant cluster corresponding to a first geographic region according to an illustrative embodiment of the disclosed subject matter.

FIG. 7 is a table illustrating a similarity matrix generated by comparing a reference vector of the reference merchant cluster with the vector of the merchant cluster corresponding to the first geographic region described in FIG. 6 according to an illustrative embodiment of the disclosed subject matter.

FIG. 8A is a table illustrating an improved match of the merchant cluster of the first geographic region against the reference merchant cluster after realignment of cluster labels based on results of the similarity matrix shown in FIG. 7 according to an illustrative embodiment of the disclosed subject matter. FIG. 8B is a table illustrating an improved match of the merchant cluster of three different geographic region against the reference merchant cluster after realignment of cluster labels according to an illustrative embodiment of the disclosed subject matter.

FIG. 9 is a flow chart illustrating a representative method, for generating location based merchant clusters based upon monitored consumer transaction activity, implemented according to an illustrative embodiment of the disclosed subject matter.

Figure 1:
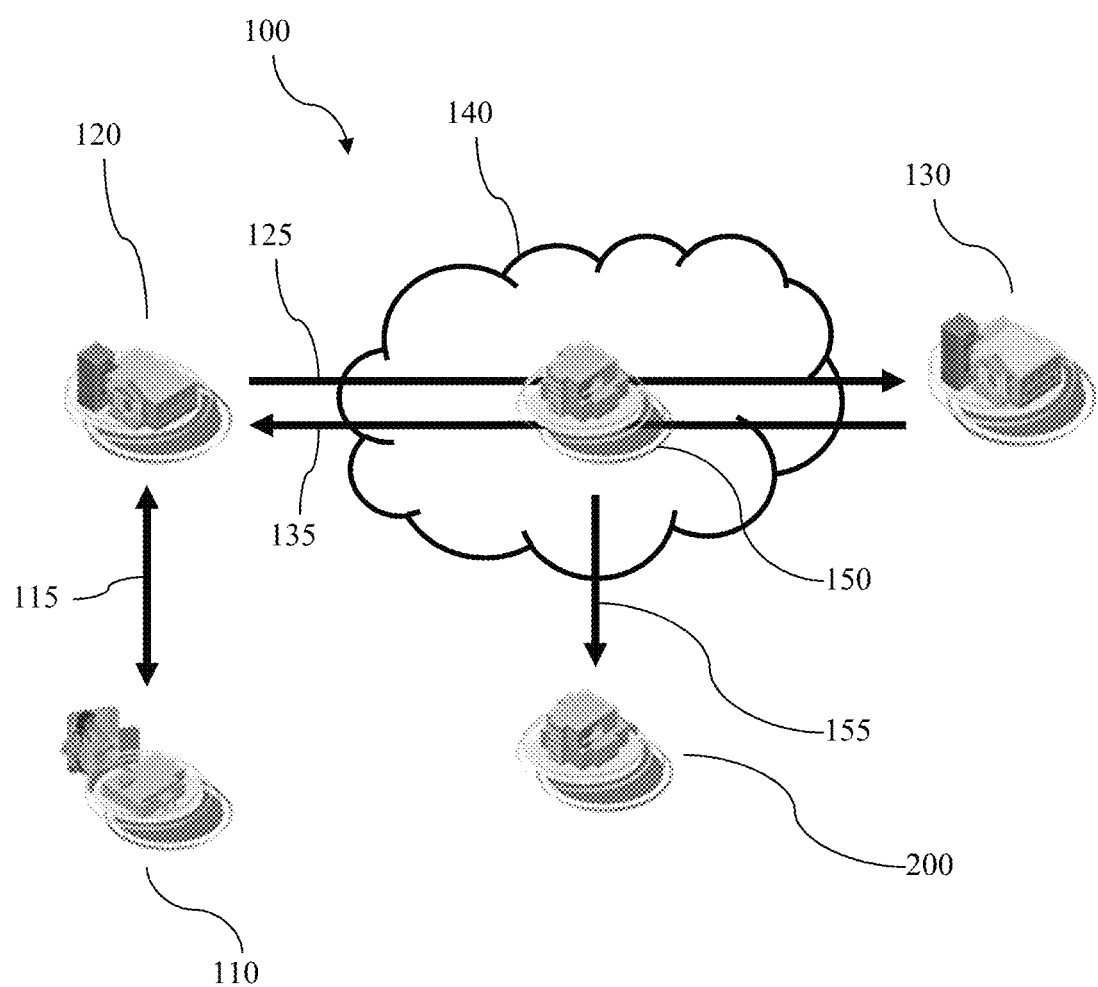
FIG. 1 is a diagram illustrating a representative payment network according to an illustrative embodiment of the disclosed subject matter.

Throughout the drawings, the same reference numerals and characters, unless otherwise stated, are used to denote like features, elements, components or portions of the illustrated embodiments. Moreover, while the present disclosed subject matter will now be described in detail with reference to the figures, it is done so in connection with the illustrative embodiments.

DETAILED DESCRIPTION

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The methods, systems, networks, and media presented herein can be used for generating location based merchant clusters based upon monitored consumer transaction activity. The disclosed subject matter provides innovative clustering techniques which can effectively factor in not only geographical influence but can also factor in cardholders' shopping patterns, which may be impacted by their cultural heritage and geographic location, into consideration when clustering merchants.

The accompanying figures, where like reference numerals refer to identical or functionally similar elements throughout the separate views, further illustrate various embodiments and explain various principles and advantages all in accordance with the disclosed subject matter. While the present disclosed subject matter is described with respect to using methods, systems, networks, and media for generating location based merchant clusters based upon monitored consumer transaction activity, one skilled in the art will recognize that the disclosed subject matter is not limited to the illustrative embodiments. For example, the methods, systems, networks, and media for calculating generating location based merchant clusters can be used with a wide variety of retail applications, such as generating clusters of restaurants, bars, movie theaters, recreation parks, and a variety of other vendors where consumers spend money. Furthermore, such location based clustering systems and techniques can also be used for non-retail applications such as identifying places of interest, tourist hotspots, finding clean places to eat, etc.

FIG. 1 depicts a diagram illustrating a representative payment network 100 according to an illustrative embodiment of the disclosed subject matter. Payment network 100 can allow for payment transactions in which merchants and card issuers do not necessarily have a one-to-one relationship. The payment network 100, for example and without limitation a credit card payment system, can utilize an electronic payment network 140, such as the MasterCard® payment card system interchange network. MasterCard® payment card system interchange network is a proprietary communications standard promulgated by MasterCard International Incorporated® based on the ISO 8583 message format for the exchange of financial transaction data between financial institutions that are consumers of MasterCard International Incorporated. (MasterCard is a registered trademark of MasterCard International Incorporated located in Purchase, N.Y.)

As embodied herein, the payment network 100 for collecting funds can include at least one merchant 110 connected to at least one electronic payment network 140, either directly or through an acquirer 120 via connection 115. At least one acquirer 140 can be connected to the electronic network 140, and each merchant 110 can be in communication with at least one acquirer 120 via the at least one payment network 140 or connection 115. At least one issuer 130 can be connected to the electronic network 140, and each acquirer 120 can be in communication with at least one issuer 130 via the electronic payment network 140.

For purpose of illustration and not limitation, in payment network 100, a financial institution, such as an issuer 130, can issue an account, such as a credit card account or a debit card account, to a cardholder (e.g., an individual consumer or a corporate or commercial consumer), who can use the payment account card to tender payment for a purchase from a merchant 110 or to conduct a transaction at an ATM or website. To accept payment with the payment account card, merchant 110 can establish an account with a financial institution that is part of the financial payment system. This financial institution can be referred to as the "merchant bank" or the "acquiring bank," or herein as "acquirer 120." When a cardholder tenders payment for a purchase with a payment account card, the merchant, ATM, or website 110 can request authorization from acquirer 120 for the amount of the purchase. The request can be performed over the telephone, online via a website, or through the use of a point-of-sale terminal which can read the cardholder's account information from the magnetic stripe on the payment account card, from a smart card using contact pads, or contactlessly from a near-field communication (NFC) device and communicate electronically with the transaction processing computers of acquirer 120. Alternatively, acquirer 120 can authorize a third party to perform transaction processing on its behalf. In this case, the point-of-sale terminal can be configured to communicate with the third party. Such a third party can be referred to as a "merchant processor" or an "acquiring processor."

As embodied herein, using payment network 140, the computers of acquirer 120 or the merchant processor can communicate information regarding payment card transactions with computers of the issuer 130. For example and not limitation, information regarding payment card transactions can include an authorization request 125 and an authorization response 135. An authorization request 125 can be communicated from the computers of the acquirer 120 to the computers of issuer 130 to determine whether the cardholder's account is in good standing and whether the purchase is covered by the cardholder's available credit line or account balance. Based on these determinations, the authorization request 125 can be declined or accepted, and an authorization response 135 can be transmitted from the issuer 130 to the acquirer 120, and then to the merchant, ATM, or website 110. The authorization request 125 can include account information identifying the merchant, location information (e.g., an address of the merchant), and transaction information, as discussed herein. The authorization response 135 can include, among other things, a result of the determination that the transaction is approved or declined and/or information about the status of the payment card or payment account.

For example and not limitation, at least one payment network server 150 can be connected to the electronic payment network 140 and configured to automatically capture the data representing a plurality of variables related to payment card transactions from the electronic payment network 140. Additionally, the payment network server can be connected to a system 200 for predicting acceptance of a commercial card product either by the electronic payment network 140 or a separate connection 155. As embodied herein, the payment network server 150 can be configured to only capture the data representing a plurality of variables related to payment card transactions with the permission of the cardholder. Additionally, the payment network server 150 can be configured to only capture the information regarding payment card transactions in accordance with applicable data privacy laws.

Figure 2:
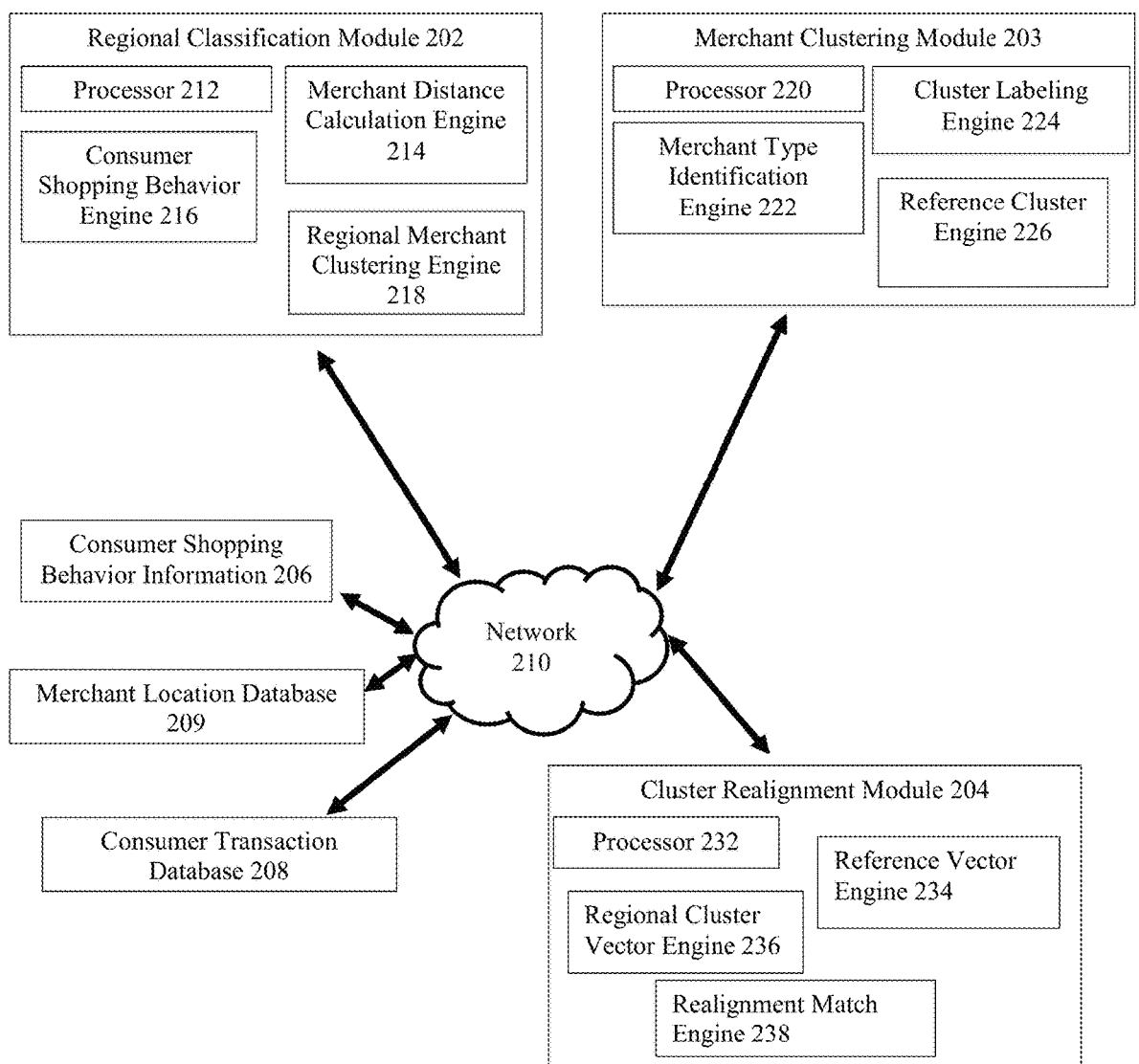
FIG. 2 is a diagram illustrating a system for generating location based merchant clusters based upon monitored consumer transaction activity according to an illustrative embodiment of the disclosed subject matter.

FIG. 2 depicts a block diagram illustrating a representative system 200 for generating location based merchant clusters based upon monitored consumer transaction activity according to an illustrative embodiment of the disclosed subject matter. The exemplary system 200 can include at least a regional classification module 202, a merchant clustering module 203, a cluster realignment module 204, consumer shopping behavior information 206, a consumer transaction database 208, a merchant location database 209, which can all communicate with each other over network 210. Network 210 may be a wireless network, local area network, the world wide web, or any other suitable network.

In some embodiments, the regional classification module 202, merchant clustering module 203, and cluster realignment module 204 can be both be part of the same entity and can share computing resources. For example, the processor 212, processor 220, and processor 232 can be part of the same processor and/or can share processing circuitry and/or processing software. In some embodiments, merchant clustering module 203 and cluster realignment module 204 can be both be part of the same entity and can share computing resources but can be separate and independent from regional classification module 202. In some other embodiments, the regional classification module 202, merchant clustering module 203, and cluster realignment module 204 can be independent entities that do not share the same resources and can be located in different locations.

As embodied herein, the regional classification module 202 can include a processor 212, a merchant distance calculation engine 214, a consumer shopping behavior engine 216, and a regional merchant clustering engine 218. The regional classification module 202 can define geographic regions. For example, the regional classification module 202 can divide a country into several geographic regions (e.g., Los Angeles metropolitan area, New York City metropolitan area, San Francisco Bay Area, Pacific Northwest, Southern Florida, etc.) by grouping several different zipcodes together. The regional classification module 202 can associate each geographic region with multiple different zipcodes. For example, by querying a map database and/or a publicly available database (e.g., Yellow Pages), the regional classification module 202 can identify which particular zipcodes belong to a particular geographic area. The regional classification module 202 can associate different merchants located across the country with a particular geographic region that it has identified based on the location of the merchant.

In some embodiments, the merchant distance calculation engine 214, under instructions from processor 212, can calculate each merchant's distance from the center of a particular zip code. The regional classification module 202 can determine, from one or more sources such as merchant location database 209, the location (e.g., a latitude and longitude) of each particular merchant. The merchant distance calculation engine 214 can further identify from such merchant location information, the merchant in each merchant category that is closest to the center of each given zip code. The merchant distance calculation engine 214 can create a database and/or table that stores the distance from the center of each zip code to the closest merchant in each merchant category to that corresponding zip code. In this manner, the merchant distance calculation engine 214 can create an association of merchants and their nearest zipcodes, which can be used by regional merchant clustering engine 218 to generate merchant clusters by geographic region.

In some embodiments, the consumer shopping behavior engine 216 can identify different parameters and/or shopping behavior information by monitoring consumer behaviors and/or shopping trends by analyzing the consumer shopping behavior information 206 and/or analyzing consumer transaction activity in the consumer transaction database 208. The consumer shopping behavior engine 216 can obtain customer transaction data from a variety of sources (e.g., credit card transaction database, debit card transaction database, digital wallet database, etc.) within a predetermined period of time (e.g., a defined time window to avoid getting antiquate and/or stale data). The consumer shopping behavior engine 216 can analyze consumer shopping activity across the country and examine such data from different geographic regions in isolation to determine discrete shopping patterns amongst different groups of consumers. For example, the consumer shopping behavior engine 216 can identify that different groups of consumers visit a certain group of merchants based on certain parameters (e.g., spending power and/or financial status of consumers, age groups of consumers, gender of consumers, etc.). By analyzing the consumer shopping behavior of different groups of consumers against the consumer profile data of the consumers whose shopping data is being analyzed, the consumer shopping behavior engine 216 can identify each of these parameters (e.g., spending power and/or financial status of consumers, age groups of consumers, gender of consumers, etc.) that affects customer shopping behavior in different geographic regions. The consumer shopping behavior engine 216 can also associate each merchant with specific parameters (e.g., associate a store such as Dior or Stuart Weitzman with parameters such as women's apparel, luxury goods, high fashion, etc.). These parameters identifying different types of customer shopping behavior preferences that the consumer shopping behavior engine 216 associates with each merchant can be used to identify merchants for clustering purposes by the regional merchant clustering engine 218. In some embodiments, the consumer shopping behavior engine 216 can identify which groups of merchants are visited by the same groups of customers from their transactional data (e.g., consumer transaction database 208). For example, by analyzing different consumers' payment card (e.g., credit card and/or debit card) transaction data, the consumer shopping behavior engine 216 can identify that several customers who visit merchant A also visit merchant B in a given geographic region. The consumer shopping behavior engine 216 can identify such associations between merchants per geographic region, which can be used by the regional merchant clustering engine 218 to generate regional merchant clusters in each geographic region.

In some embodiments, the regional merchant clustering engine 218 can generate a cluster of merchants based on each geographic region identified by the regional classification module 202 and based on the merchants identified to be in each of those geographic regions by the merchant distance calculation engine 214. In addition to geographic location, the regional merchant clustering engine 218 can determine which merchants are to be populated in each cluster based on the parameters identified by the consumer shopping behavior engine 216. The regional merchant clustering engine 218 can generate multiple different merchant clusters for a given geographic region. Each merchant cluster can be associated with a specific combination of parameters. For example, the regional merchant clustering engine 218 can generate multiple different merchant clusters for each geographic region based on the different merchant classifications by separating them by parameter (e.g., a first cluster of merchants in New York City for wealthy women in their thirties, a second cluster of merchants in New York City for graduate students in their mid-twenties, etc.). Each cluster of merchants can be generated based on a combination of geographic location of the merchants, parameters associated with the merchants (e.g., spending power and/or financial status of consumers, age groups of consumers, gender of consumers, etc.), and based on data obtained from the consumer transaction database 208 that indicates which merchants a particular demographic of consumers visit (e.g., determining that a low-income consumer visits discount retailers such as Wal-Mart, fast food restaurants, and cheaper grocery stores while determining that high-income consumer visits fine dining and/or haute-cuisine restaurants, designer luxury brand stores, and Broadway musicals). In some embodiments, the regional merchant clustering engine 218 can use consumer shopping behavior information 206 to generate merchant clusters. The regional classification module 202 can obtain consumer shopping behavior information 206 from one or more sources. The consumer shopping behavior information 206 can include data on the consumer's needs (e.g., frequency of purchases, types of purchases, how recently each type of item was purchased, etc.) and the consumer's affordability (e.g., total amount of spending per consumer, total amount spent in each merchant category, amount spent per visit to each merchant, maximum and minimum amounts spent per visit to each merchant, etc.). The regional merchant clustering engine 218 can identify potential consumers per merchant category who might have a high affinity for shopping at a given merchant given their shopping behavior information 206.

As embodied herein, the merchant clustering module 203 can include at least a processor 220, a merchant type identification engine 222, a cluster labeling engine 224, and a reference cluster engine 226. The merchant clustering module 203 can generate a reference merchant clusters to improve the accuracy of regional merchant cluster generation. For example, the reference cluster engine 226 can generate a country-level reference merchant cluster based on transactions made by consumers within a defined time period (e.g., as identified from information obtained from consumer transaction database 208). In some embodiments, such a country level reference merchant cluster can serve as reference for the cluster realignment module 204 to realign the regional merchant clusters generated by regional merchant clustering engine 218. Merchant clusters can be generated based on the level of activity between a set of merchants by the same consumer. For example, the strength of the linkage between a pair of merchants determined by the reference cluster engine 226 can be proportional to the number of times a particular consumer visits that pair of merchants. The reference cluster engine 226 can use aggregate merchants (i.e., chain stores) as a means of normalizing the regional merchant clusters with respect to the country-level reference merchant cluster(s). For example, as illustrated in FIGS. 5A and 5B, the reference cluster engine 226 can compare the reference merchant cluster against the regional merchant cluster(s) based on the type of merchant and calculate a match score, which is described in greater detail below in connection with reference to FIGS. 5A and 5B.

In some embodiments, the merchant type identification engine 222 can identify the different types of merchants and can compare the different regional merchant clusters generated by the regional merchant clustering engine 218 against the reference merchant cluster by comparing the types of merchants in each of these clusters. For example, the merchant type identification engine 222 can identify the merchant type and/or industry of each merchant in the reference merchant cluster and the regional merchant clusters.

In some embodiments, the cluster labeling engine 224 can assign cluster labels to each of the merchants in the reference merchant cluster and each of the regional merchant clusters. For example, in some embodiments, the cluster labeling engine 224 can initially assign cluster labels to each merchant cluster (i.e., both the reference merchant cluster and each of the regional merchant clusters) based on the type of merchant determined by the merchant type identification engine 222 (e.g., assign a cluster label of '1' to restaurants, a cluster label of '2' to grocery stores, etc.). In some embodiments, the cluster label can be initially assigned to merchants in a merchant cluster in a completely arbitrary manner without any regard to the type of merchant.

As embodied herein, the cluster realignment module 204 can include at least a processor 232, a reference vector engine 234, a regional cluster vector engine 236, and a realignment match engine 238. The cluster realignment module 204 can realign the cluster labels initially assigned to different regional merchant clusters by merchant type with respect to the reference merchant cluster. For example, the cluster realignment module 204 can realign the cluster labels for merchants in regional merchant clusters so that each merchant in each regional merchant cluster is assigned the same cluster label assigned to a merchant of the corresponding merchant type in the reference merchant cluster(s), as illustrated in greater detail in FIGS. 6A-8B. In some embodiments, the reference vector engine 234, under direction from processor 232, can generate a reference vector as illustrated in FIG. 6A. In some embodiments, the reference vector engine 234 can create a reference vector that contains, in each row of the reference vector, the initial match value for the merchant corresponding to the row in a regional cluster against the reference cluster before any realignment.

In some embodiments, the regional cluster vector engine 236, under direction from processor 232, can generate a regional vector as illustrated in FIG. 6B, for each different geographic region. The regional cluster vector engine 236 can create regional vectors for each geographic region that contains the match value of each cluster label in each regional merchant cluster after realignment as compared to the reference merchant cluster to indicate the level of match between the regional merchant cluster and the reference merchant cluster using a given cluster label scheme after a realignment has been performed, which may further need to be realigned to optimize the level of match.

In some embodiments, the realignment match engine 238 can realign the cluster labels of the regional merchant clusters by comparing the regional vectors against the reference vector. For example, the realignment match engine 238 can realign each cluster label in a merchant cluster as much as possible with the reference merchant cluster. The realignment match engine 238 can use a similarity score of cluster labels between the reference cluster and the regional merchant clusters, which can be generated by creating the dot product of the reference vector and the regional vectors, to re-align cluster labels. In some embodiments, the realignment match engine 238 can determine an optimal cluster label realignment scheme for each regional merchant cluster from the results of performing the similarity comparison using the reference vector and the corresponding regional vector(s). The realignment match engine 238 can realign the cluster labels in each regional merchant cluster based on the determined optimized cluster label realignment scheme to normalize each regional merchant cluster with respect to the reference merchant cluster so that different merchant clusters can be compared across different geographic regions in a more uniform manner. After the realignment match engine 238 has performed such cluster label realignment of each regional merchant cluster, different merchant clusters from different geographic regions can be compared against each other to identify actionable customer shopping behavior and/or patterns both in a local and geographically wider context. For example, after realignment of merchant cluster labels in each regional merchant cluster, a cluster label of '1' can identify a certain type of merchant and/or a particular aggregate merchant (i.e., chain store) across many different regions. As an example, after realignment, all Target stores across the country can have a cluster label of '1' in each regional cluster that includes a Target store. After realignment, it can be helpful to see that consumers in a particular region A have the same shopping behavior as consumers in different region B (e.g., their regional merchant clusters are similar and/or identical).

In some embodiments, by creating regional merchant clusters and normalizing the cluster labels for each merchant in these regional merchant clusters across different geographic regions, the disclosed system 200 can generate a new domain of independent variables in the different geographic location to predict consumer behavior pattern, which can increase the predictive power of customer behavior prediction models. By using such normalized regional merchant clusters, merchants and/or advertisers can find the appropriate target consumers and/or geographic regions for their local stores' promotion and advertisement. For example, it can be determined, using the disclosed subject matter, that supermarket A and restaurant B are highly correlated and have been grouped in one merchant cluster based on the local consumer transaction data. Such merchant clustering can indicate that customers are likely to visit and spend money at these merchants (i.e., supermarket A and restaurant B) together. In some embodiments, the merchants in same cluster can be encouraged to 'cartelize' and/or form a merchant alliance. For example, when a customer makes a transaction at supermarket A, the disclosed system 200 can automatically check the transaction history of that customer and decide whether to provide that customer with a personalized discount coupon for restaurant B if supermarket A and restaurant B are part of the same merchant cluster. By normalizing the merchant clusters across different geographic regions, customer shopping behaviors across different geographic regions can be better understood and global and/or country-level shopping patterns amongst different customer segments can be identified to an unprecedented level of granularity. Such targeted promotion using the disclosed subject matter can enhance customers' loyalty and increase sales by effectively predicting consumer behaviors and/or shopping patterns.

In some embodiments, by creating regional merchant clusters and normalizing the cluster labels for each merchant in these regional merchant clusters across different geographic regions, the disclosed system 200 can help consumers find a suitable merchant and have an improved shopping experience. For example, by being based on consumers' historical transaction data, the regional merchant clusters can be used to provide consumers with a recommendation of a merchant at which to shop to satisfy their shopping experience. For example, by determining the customer segment that a particular consumer belongs to and/or by determining, from the transactional data of a given consumer, that the consumer has shopped at a merchant in an established regional merchant cluster, the disclosed system 200 can provide a recommendation for another merchant that that consumer should consider shopping (e.g., another merchant in that identified regional merchant cluster). In some embodiments, the regional merchant clusters can be used as a guideline, for example, through a software application in consumers' devices (e.g., smartphone, tablet, laptop, etc.), to provide shoppers with real time information of their favorite products. For example, if a particular user purchases a particular type of product (e.g., a video game system) at an electronics store A, the system 200 can determine that another merchant B (e.g., a video game store) that is part of the same merchant cluster as electronics store A is currently having a sale on video games and can provide the user with such real-time promotions for merchant B, thereby improving the consumer's shopping experience and providing targeted promotions for a different merchant that the consumer may not be aware of.

In some embodiments, the disclosed system 200 can provide consumers traveling to different geographic regions than their home region with recommendations for finding their favorite stores and/or products. For example, when a consumer travels from region A to region B that does not have the same merchants as region A, leading the consumer to have to select from a variety of unfamiliar stores, the system 200 can identify, which regional merchant clusters in region B have a high degree of match with regional merchant clusters from region A and/or regional merchant clusters in region A that include merchants at which the customer has previously shopped frequently. By identifying regional merchant clusters in region B that match the consumers' shopping activity in region A, the system 200 can provide the consumer with recommendations of merchants in region B that are a member of the matching regional merchant cluster in region B that is determined to have a high match with region A merchant clusters associated with the consumer.

FIG. 3 is a diagram illustrating a table 300 of transaction history data identifying the number of times each consumer has conducted transactions at a given merchant location. The system 200 can identify from the consumer transaction database 208, a plurality of different merchants at which different customers have shopped and can generate and/or retrieve a table 300 identifying such information. As shown in FIG. 3, table 300 indicates how many transactions a particular consumer account (e.g., Acct 1, Acct 2, etc.) has conducted at a particular merchant (e.g., store1, store2, etc.). As depicted by the embodiment illustrated in FIG. 3, table 300 illustrates customer transaction activity by fifteen different consumers at twenty different merchants located in the same geographic region. By determining that a particular consumer (e.g., Acct 2) has visited a particular set of stores frequently (e.g., store1, store2, and store3) and determining that other consumers (e.g., Acct 1 and Acct 5) have visited the same three merchant locations, the merchant clustering module 203 can determine that these three stores should be part of the same merchant cluster since there exists a high degree of correlation in shopping activity of the same customer at each of these stores. The system 200 can further determine whether these consumers (i.e., Acct 1, Acct 2, and Acct 5) have similar demographic profiles (e.g., spending power and/or financial status of consumers, age groups of consumers, gender of consumers, geographic location, etc.) and if so, associate the generated merchant cluster (i.e., merchant cluster having Acct 1, Acct 2, and Acct 5 as members) with a particular parameter identified to be common from the different consumers (i.e., Acct 1, Acct 2, and Acct 5). In some embodiments, the table 300 can be used to generate a regional merchant cluster by regional merchant clustering engine 218 upon determining that the merchants in table 300 are located in the same geographic region as determined by merchant distance calculation engine 214.

In some other embodiments, the table 300 can be used to generate a country-level merchant cluster (e.g., a reference merchant cluster) by merchant clustering module 203 if the merchants in table 300 are scattered throughout different geographic locations.

Figure 4A:
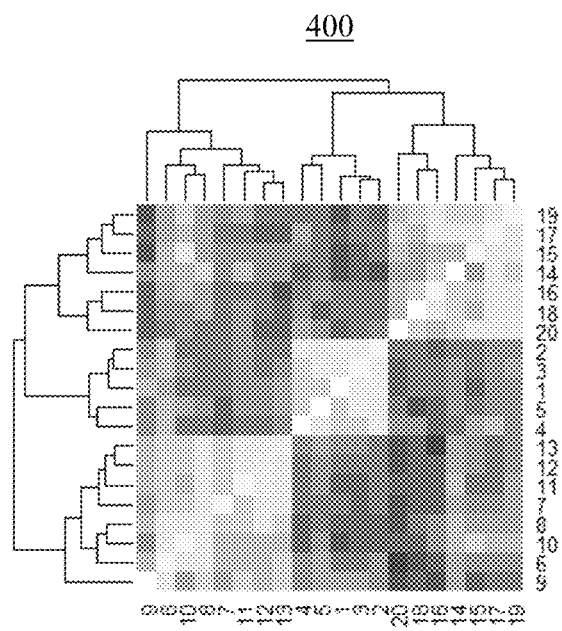
FIG. 4A is a heatmap illustrating the shopping pattern of a plurality of different consumers in a local region with a plurality of different merchants according to an illustrative embodiment of the disclosed subject matter.

FIG. 4A shows a heatmap 400 illustrating the shopping pattern of a plurality of different consumers in a local region with a plurality of different merchants. For example, in the embodiment illustrated by FIG. 4A, the table 300 of consumer transactional activity for a particular geographic region having twenty merchants and fifteen consumers is analyzed to determine that there exist three different regional merchant clusters in this region. The regional merchant clustering engine 218 can identify the existence of these three merchant clusters provided the data available in table 300 using one or more available cluster analysis techniques (e.g., hierarchical clustering, centroid based clustering, distribution based clustering, density based clustering, fuzzy clustering, hard clustering, subspace clustering, etc.). As shown in heatmap 400, the table 300 can be clustered to generate heatmap 400 upon processing table 300 using one or more cluster analysis techniques to determine the existence of three different regional merchant clusters.

Figure 4B:
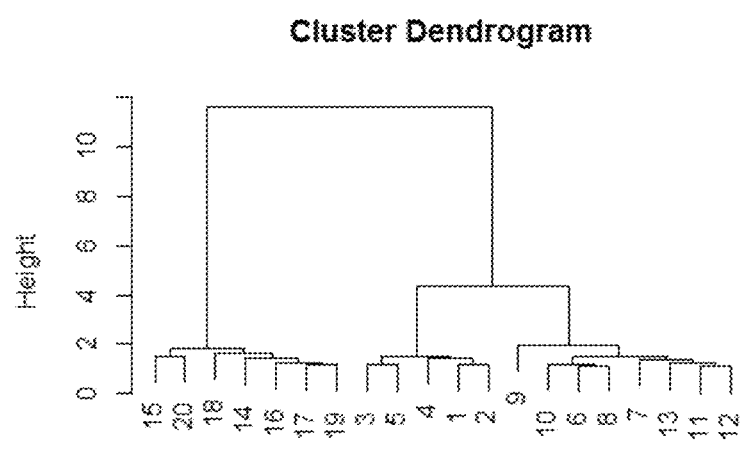
FIG. 4B is a cluster dendrogram illustrating the identified clusters of the plurality of different merchants in the local region from the shopping pattern of the plurality of different merchants at these different merchants according to an illustrative embodiment of the disclosed subject matter.

FIG. 4B is a cluster dendrogram 450 illustrating the identified clusters of the plurality of different merchants in the local region from the shopping pattern of the plurality of different merchants at these different merchants. For example, in the embodiment illustrated by FIG. 4B, the table 300 of consumer transactional activity for a particular geographic region having twenty merchants and fifteen consumers is analyzed to determine that there exist three different regional merchant clusters in this region, which are reflected by cluster dendrogram 450. As shown in FIG. 4B, regional merchant cluster 1 includes seven merchants (i.e., store15, store20, store18, store14, store16, store17, and store19), regional merchant cluster 2 includes five merchants (i.e., store3, store5, store4, store1, and store2) and regional merchant cluster 3 includes eight merchants (i.e., store9, store10, store6, store8, store7, store13, store11, and store12). The cluster dendrogram 450 illustrates that the degree of linkage between certain merchants within a particular can be higher than other merchants in that same cluster (e.g., there are subgroupings of merchants within a given cluster). Such a cluster dendrogram can be generated by the regional merchant clustering engine 218. In some embodiments, a similar clustering is performed by reference cluster engine 226 to generate a country-level reference merchant cluster.

FIG. 5A is a table illustrating cluster labels being compared for different merchants clusters in different geographic regions against a reference merchant cluster according to an illustrative embodiment of the disclosed subject matter. In the embodiment illustrated by FIG. 5A, the different rows of table 500 correspond to a different aggregate merchant in the reference merchant cluster. As shown in table 500, the reference merchant cluster has eight rows, each of which accordingly correspond to one of eight corresponding aggregate merchants. As shown in table 500, the reference merchant cluster's merchants are labeled with three distinct cluster labels (i.e., 1, 2, and 3). In each row of table 500, a corresponding merchant in regional merchant clusters 1, 2, and 3 are also listed in different columns. The merchants of each regional merchant cluster are arranged in table 500 so that the merchant that corresponds to the same merchant category in the reference merchant cluster is placed in the row of table 500 in which that merchant in the reference merchant cluster is placed. For example, the row in table 500 marked as row 1 (i.e., the AGG ID List is marked as 1) has a merchant in the reference merchant cluster that is labeled with a cluster label of 3 while the same row of table 500 has a merchant in regional cluster 1 that is labeled with a cluster label of 2, a merchant in regional cluster 2 that is labeled with a cluster label of 2, and a merchant in regional cluster 3 that is labeled with a cluster label of 1. Each of the merchants in regional clusters 1, 2, and 3 are arranged in this row of table 500 because that merchant corresponds to the same merchant category as the merchant in the reference cluster occupying that row of the table 500. While cluster labels for regional merchant clusters can be initially arbitrarily assigned, the merchants in the regional clusters are aligned in the table 500 to match the merchant category of the reference category. If the regional cluster does not have a merchant in the merchant category listed in a reference cluster listed in a particular row of table 500, a cluster label of 0 is entered into that row of table 500 for that regional cluster to indicate the absence of a matching merchant category entry in the given regional merchant cluster.

FIG. 5B is a table 550 illustrating the level of match of a particular merchant cluster for a given geographic region against that of a reference merchant cluster. The table 550 is an abridged version of table 500 in that it merely provides, in each row of table 550, a merchant in regional cluster 1 that corresponds to the merchant in the reference cluster without providing such information for regional merchant clusters 2 and 3. However, table 550 also includes a match score for each row, which is a binary value. For example, the match score in table 550 is a 1 for a given row of table 550 if the cluster label in that given row for the reference merchant cluster matches the cluster label of the regional merchant cluster in that given row. The match score in table 550 has a value of '0' for a given row of table 550 if the cluster label in that given row for the reference merchant cluster does not match the cluster label of the regional merchant cluster in that given row. By summing up the match scores, it can be determined that with this initial cluster labeling scheme of the regional merchant cluster 1, a match score of '2' is calculated. Since cluster labels for the regional merchant clusters can be arbitrarily assigned initially, any pair of label numbers in the same regional merchant cluster can be switched. Accordingly, in some embodiments, cluster realignment module 204 can re-align each cluster label of each regional merchant cluster as much as possible with the reference cluster to maximize the match score with respect to the reference cluster.

FIG. 6A is a table 600 illustrating a reference vector of a reference merchant cluster. In the embodiment illustrated by FIG. 6A, a reference vector includes the initial match scores of each of three different clusters in a reference region compared against a reference cluster as shown in FIG. 5B before the regional clusters' cluster labels have been realigned. Such a reference vector can be generated by reference vector engine 234 for the purpose of calculating a similarity score when compared against a regional vector to realign cluster labels in a regional merchant cluster. The reference vector can include rows for each different type of merchant and/or each merchant that merchant clustering module 203 is aware of as a result of generating regional clusters. By having entries for as many different types of merchants included even though the merchants associated with the entries of the reference vector may not be present in the same geographic region, the reference vector can become a country-level reference vector that can be compared against various different regional vectors to realign cluster labels associated with the regional clusters associated with the different regional vectors.

FIG. 6B is a table 650 illustrating a regional vector of a regional merchant cluster corresponding to a first geographic region. In the embodiment illustrated by FIG. 6B, a regional vector includes the match scores of each of three different regional merchant clusters in a geographic region 1 compared against a reference cluster as shown in FIG. 5B. Such a regional vector can be generated by regional cluster vector engine 236 for the purpose of calculating a similarity score when compared against a reference vector to realign cluster labels in each regional merchant cluster. As shown in FIG. 6B, each column of the regional vector can correspond to a different regional cluster of a given geographic region represented by the regional vector. As shown in FIG. 6B, each column of the regional vector can include match score for different merchants in the corresponding regional merchant cluster compared against the reference cluster.

FIG. 7 is a table illustrating a similarity matrix 700 generated by comparing a reference vector of the reference merchant cluster with the vector of the merchant cluster corresponding to the first geographic region described in FIG. 6. The realignment match engine 238 can create such a similarity matrix 700 by performing the dot product of the matrices of reference vector 600 and the regional vector 650. By performing such a dot product, the realignment match engine 238 can examine the resulting similarity matrix and determine, for each regional merchant cluster, which cluster label realignment maximizes the value of the similarity score with respect to the reference vector. For example, as shown by similarity matrix 700, each cluster label marked '1' in the regional vector has a maximum score of '2' for a reference vector cluster label of '1', each cluster label marked '2' in the regional vector has a maximum score of '2' for a reference vector cluster label of '3', and each cluster label marked '3' in the regional vector has a maximum score of '2' for a reference vector cluster label of '2'. Accordingly from such results in the similarity matrix, the realignment match engine 238 can determine that cluster labels need to be realigned for each regional merchant cluster in regional vector 650 (i.e., each of the three regional merchant clusters in that region 1) according to the cluster labeling scheme determined from the results of the similarity matrix to maximize the similarity score. For example, the realignment match engine 238 can determine that clusters labels in each of the three regional merchant clusters in that region 1 should be updated such that a cluster label of '1' should remain unchanged but that a cluster label of '2' should be changed to a cluster label of '3', and that a cluster label of '3' should be changed to a cluster label of '2'.

FIG. 8A is a table 800 illustrating an improved match of the merchant cluster of the first geographic region against the reference merchant cluster after realignment of cluster labels based on results of the similarity matrix shown in FIG. 7. In the embodiment illustrated by FIG. 8A, the realignment match engine 238 has already realigned the cluster labels of regional merchant cluster 1 for geographic region 1 from that of table 550 in FIG. 5B to improve the match score to a total summed match value of '6' instead of a match value of 2 as shown in table 550 before realignment of the cluster labels.

FIG. 8B is a table 850 illustrating an improved match of the merchant cluster of three different geographic regions against the reference merchant cluster after realignment of cluster labels. In the embodiment illustrated by FIG. 8B, the realignment match engine 238 has already realigned the cluster labels of all three regional merchant clusters for region 1 to provide a total match score of 19. The effect of such a realignment is that after realignment, the cluster labels for merchants are now normalized according to the same cluster labeling scheme in the regional merchant clusters as they are in the reference cluster. Performing such cluster label realignment process for each of the different regional merchant clusters with respect to the reference cluster can normalize the cluster labels of each of the different regional merchant clusters to provide a uniform manner of referencing different merchants across different geographic regions' regional merchant clusters.

FIG. 9 is a flow chart illustrating a representative method, for generating location based merchant clusters based upon monitored consumer transaction activity. The exemplary network 100 of FIG. 1 and system 200 of FIG. 2, tables of FIGS. 3-8, for purpose of illustration and not limitation, are discussed with reference to the exemplary method 900 of FIG. 9.

At step 902, the processor can obtain transaction activity of consumers. For example, the regional classification module 202 can obtain consumer transaction data from a variety of sources including the consumer transaction database 208 for a variety of different geographic regions within a predetermined time period. FIG. 3 illustrates such an obtained transaction activity for a particular geographic region.

At step 904, the processor can generate a reference merchant cluster based on transactions conducted within a predetermined period of time. For example, the reference cluster engine 226 can generate a country-level reference merchant cluster based on transactions made by consumers within a defined time period. In some embodiments, such a country level reference merchant cluster can serve as reference for the cluster realignment module 204 to realign cluster labels of the regional merchant clusters generated by regional merchant clustering engine 218. The reference cluster engine 226 can use aggregate merchants (i.e., chain stores) as a means of normalizing the regional merchant clusters with respect to the country-level reference merchant cluster(s).

At step 906, the processor can identify different geographic regions and merchants located within each identified geographic region. For example, the regional classification module 202 can divide a country into several geographic regions by grouping several different zipcodes together. The regional classification module 202 can associate each geographic region with multiple different zipcodes. The regional classification module 202 can associate different merchants located across the country with a particular geographic region that it has identified based on the location of the merchant. The merchant distance calculation engine 214 can create an association of merchants and their nearest zipcodes, which can be used by regional merchant clustering engine 218 to generate merchant clusters by geographic region.

At step 908, the processor can generate a regional merchant cluster for each geographical region based on consumer transactional activity. For example, by analyzing different consumers' payment card (e.g., credit card and/or debit card) transaction data, the consumer shopping behavior engine 216 can identify that several customers who visit merchant A also visit merchant B in a given geographic region. The consumer shopping behavior engine 216 can identify such associations between merchants per geographic region, which can be used by the regional merchant clustering engine 218 to generate regional merchant clusters in each geographic region. In some embodiments, the regional merchant clustering engine 218 can generate a cluster of merchants based on each geographic region identified by the regional classification module 202 and based on the merchants identified to be in each of those geographic regions by the merchant distance calculation engine 214. In addition to geographic location, the regional merchant clustering engine 218 can determine which merchants are to be populated in each regional merchant cluster based on the parameters identified by the consumer shopping behavior engine 216. The regional merchant clustering engine 218 can generate multiple different regional merchant clusters for a given geographic region. Each merchant cluster can be associated with a specific combination of parameters. For example, the regional merchant clustering engine 218 can generate multiple different regional merchant clusters for each geographic region based on the different merchant classifications by separating them by parameter (e.g., a first cluster of merchants in New York City for wealthy women in their thirties, a second cluster of merchants in New York City for graduate students in their mid-twenties, etc.).

At step 910, the processor can determine match scores of different regional merchant clusters in each geographic region against the reference merchant cluster. For example, the merchants of each regional merchant cluster are arranged in table 550 so that the merchant that corresponds to the same merchant category in the reference merchant cluster is placed in the row of table 550 in which that merchant in the reference merchant cluster is placed. While cluster labels for regional merchant clusters can be initially arbitrarily assigned, the merchants in the regional merchant clusters can be aligned in the table 550 to match the merchant category of the reference category. Table 550 can include a match score for each row, which is a binary value indicating whether for a given row of table 550 if the cluster label in that given row for the reference merchant cluster matches the cluster label of the regional merchant cluster in that given row.

At step 912, the processor can generate a reference vector and can generate a regional vector for each geographic region. For example, the reference vector engine 234 can create a vector that contains, in each row of the reference vector, the initial match value for the merchant corresponding to the row in a regional cluster against the reference cluster before any realignment. The regional cluster vector engine 236 can create regional vectors for each geographic region that contain the match value of each cluster label in each regional merchant cluster after realignment as compared to the reference merchant cluster to indicate the level of match between the regional merchant cluster and the reference merchant cluster using a given cluster label scheme after a realignment has been performed, which may need to be further realigned to optimized the level of match.

At step 914, the processor can calculate, for each geographic region, a new cluster labeling scheme based on a similarity calculation score determined based on the reference vector and the regional vector for that corresponding geographic region. For example, the realignment match engine 238 can create a similarity matrix 700 by performing the dot product of the matrices of the reference vector 600 and the regional vector 650. The realignment match engine 238 can examine the resulting similarity matrix and determine, for each regional merchant cluster, which cluster label realignment maximizes the value of the similarity score with respect to the reference vector. Accordingly from such results in the similarity matrix, the realignment match engine 238 can determines that cluster labels need to be realigned for each regional merchant cluster in regional vector 650 according to the cluster labeling scheme determined from the results of the similarity matrix to maximize the similarity score.

At step 916, the processor can realign the cluster labels for each of the regional merchant clusters in each geographic region based on the new cluster labeling scheme determined for that geographic region in step 914. For example, the realignment match engine 238 can realign the cluster labels in each regional merchant cluster based on the determined optimized cluster label realignment scheme to normalize each regional merchant cluster with respect to the reference merchant cluster so that different merchant clusters can be compared across different geographic regions in a more uniform manner.

At step 918, the processor can calculate the updated match score between the realigned regional merchant clusters for each geographic region and the reference merchant cluster. For example, the realignment match engine 238 can realign the cluster labels of all three regional merchant clusters for a given geographic region to provide an updated match score. The effect of such a realignment is that after realignment, the cluster labels for the different merchants are now normalized in the same cluster labeling scheme in the regional merchant clusters as they are in the reference cluster. Performing such cluster label realignment process for each of the different regional merchant clusters with respect to the reference cluster(s) can normalize the cluster labels of each of the different regional merchant clusters to provide a uniform manner of referencing different types of merchants across different geographic merchant clusters.

Figure 10:
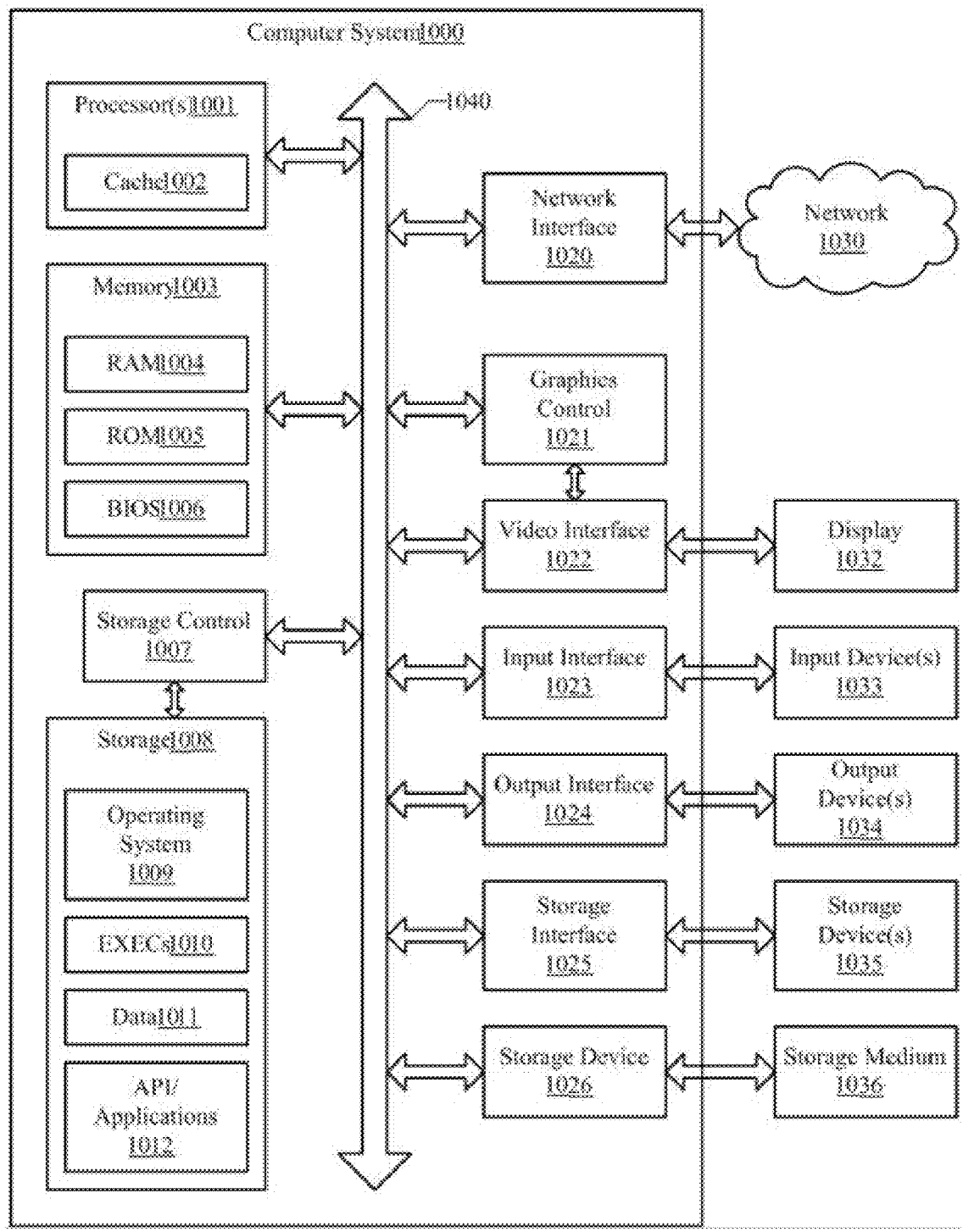
FIG. 10 is a block diagram illustrating further details of a representative computer system according to an illustrative embodiment of the disclosed subject matter.

FIG. 10 is a block diagram illustrating further details of a representative computer system according to an illustrative embodiment of the disclosed subject matter.

The systems and techniques discussed herein can be implemented in a computer system. As an example and not by limitation, as shown in FIG. 10, the computer system having architecture 1000 can provide functionality as a result of processor(s) 1001 executing software embodied in one or more tangible, non-transitory computer-readable media, such as memory 1003. The software implementing various embodiments of the present disclosure can be stored in memory 1003 and executed by processor(s) 1001. A computer-readable medium can include one or more memory devices, according to particular needs. Memory 1003 can read the software from one or more other computer-readable media, such as mass storage device(s) 1035 or from one or more other sources via communication interface 1020. The software can cause processor(s) 1001 to execute particular processes or particular parts of particular processes described herein, including defining data structures stored in memory 1003 and modifying such data structures according to the processes defined by the software. An exemplary input device 1033 can be, for example, a keyboard, a pointing device (e.g. a mouse), a touchscreen display, a microphone and voice control interface, a pressure sensor or the like to capture user input coupled to the input interface 1023 to provide data and/or user input to the processor 1001. An exemplary output device 1034 can be, for example, a display (e.g. a monitor) or speakers or a haptic device coupled to the output interface 1024 to allow the processor 1001 to present a user interface, visual content, and/or audio content. Additionally or alternatively, the computer system 1000 can provide an indication to the user by sending text or graphical data to a display 1032 coupled to a video interface 1022. Furthermore, any of the above components can provide data to or receive data from the processor 1001 via a computer network 1030 coupled the communication interface 1020 of the computer system 1000. In addition or as an alternative, the computer system can provide functionality as a result of logic hardwired or otherwise embodied in a circuit, which can operate in place of or together with software to execute particular processes or particular parts of particular processes described herein. Reference to software or executable instructions can encompass logic, and vice versa, where appropriate. Reference to a computer-readable media can encompass a circuit (such as an integrated circuit (IC)) storing software or executable instructions for execution, a circuit embodying logic for execution, or both, where appropriate. The present disclosure encompasses any suitable combination of hardware and software.

In some embodiments, processor 1001 includes hardware for executing instructions, such as those making up a computer program. As an example and not by way of limitation, to execute instructions, processor 1001 can retrieve (or fetch) the instructions from an internal register, an internal cache 1002, memory 1003, or storage 1008; decode and execute them; and then write one or more results to an internal register, an internal cache 1002, memory 1003, or storage 1008. In particular embodiments, processor 1001 can include one or more internal caches 1002 for data, instructions, or addresses. This disclosure contemplates processor 1001 including any suitable number of any suitable internal caches, where appropriate. As an example and not by way of limitation, processor 1001 can include one or more instruction caches 1002, one or more data caches 1002, and one or more translation lookaside buffers (TLBs). Instructions in the instruction caches 1002 can be copies of instructions in memory 1003 or storage 1008, and the instruction caches 1002 can speed up retrieval of those instructions by processor 1001. Data in the data caches 1002 can be copies of data in memory 1003 or storage 1008 for instructions executing at processor 1001 to operate on; the results of previous instructions executed at processor 1001 for access by subsequent instructions executing at processor 1001 or for writing to memory 1003 or storage 1008; or other suitable data. The data caches 1002 can speed up read or write operations by processor 1001. The TLBs can speed up virtual-address translation for processor 1001. In some embodiments, processor 1001 can include one or more internal registers for data, instructions, or addresses. This disclosure contemplates processor 1001 including any suitable number of any suitable internal registers, where appropriate. Where appropriate, processor 1001 can include one or more arithmetic logic units (ALUs); be a multi-core processor; or include one or more processors 1001. Although this disclosure describes and illustrates a particular processor, this disclosure contemplates any suitable processor.

In some embodiments, memory 1003 includes main memory for storing instructions for processor 1001 to execute or data for processor 1001 to operate on. As an example and not by way of limitation, computer system 1000 can load instructions from storage 1008 or another source (such as, for example, another computer system 1000) to memory 1003. Processor 1001 can then load the instructions from memory 1003 to an internal register or internal cache 1002. To execute the instructions, processor 1001 can retrieve the instructions from the internal register or internal cache 1002 and decode them. During or after execution of the instructions, processor 1001 can write one or more results (which can be intermediate or final results) to the internal register or internal cache 1002. Processor 1001 can then write one or more of those results to memory 1003. In some embodiments, processor 1001 executes only instructions in one or more internal registers or internal caches 1002 or in memory 1003 (as opposed to storage 1008 or elsewhere) and operates only on data in one or more internal registers or internal caches or in memory 1003 (as opposed to storage 1008 or elsewhere). One or more memory buses (which can each include an address bus and a data bus) can couple processor 1001 to memory 1003. Bus 640 can include one or more memory buses, as described below. In particular embodiments, one or more memory management units (MMUs) reside between processor 1001 and memory 1003 and facilitate accesses to memory 1003 requested by processor 1001. In some embodiments, memory 1003 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1003 can include one or more memories 1004, where appropriate. Although this disclosure describes and illustrates particular memory, this disclosure contemplates any suitable memory.

In some embodiments, storage 1008 includes mass storage for data or instructions. As an example and not by way of limitation, storage 1008 can include a hard disk drive (HDD), a floppy disk drive, flash memory, an optical disc, a magneto-optical disc, magnetic tape, or a Universal Serial Bus (USB) drive or a combination of two or more of these. Storage 1008 can include removable or non-removable (or fixed) media, where appropriate. Storage 1008 can be internal or external to computer system 1000, where appropriate. In some embodiments, storage 1008 is non-volatile, solid-state memory. In some embodiments, storage 1008 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1008 taking any suitable physical form. Storage 1008 can include one or more storage control units facilitating communication between processor 1001 and storage 1008, where appropriate. Where appropriate, storage 1008 can include one or more storages 1008. Although this disclosure describes and illustrates particular storage, this disclosure contemplates any suitable storage.

In some embodiments, input interface 1023 and output interface 1024 can include hardware, software, or both, providing one or more interfaces for communication between computer system 1000 and one or more input device(s) 1033 and/or output device(s) 1034. Computer system 1000 can include one or more of these input device(s) 1033 and/or output device(s) 1034, where appropriate. One or more of these input device(s) 1033 and/or output device(s) 1034 can enable communication between a person and computer system 1000. As an example and not by way of limitation, an input device 1033 and/or output device 1034 can include a keyboard, keypad, microphone, monitor, mouse, printer, scanner, speaker, still camera, stylus, tablet, touch screen, trackball, video camera, another suitable input device 1033 and/or output device 1034 or a combination of two or more of these. An input device 1033 and/or output device 1034 can include one or more sensors. This disclosure contemplates any suitable input device(s) 1033 and/or output device(s) 1034 and any suitable input interface 1023 and output interface 1024 for them. Where appropriate, input interface 1023 and output interface 1024 can include one or more device or software drivers enabling processor 1001 to drive one or more of these input device(s) 1033 and/or output device(s) 1034. Input interface 1023 and output interface 1024 can include one or more input interfaces 1023 or output interfaces 1024, where appropriate. Although this disclosure describes and illustrates a particular input interface 1023 and output interface 1024, this disclosure contemplates any suitable input interface 1023 and output interface 1024.

As embodied herein, communication interface 1020 can include hardware, software, or both providing one or more interfaces for communication (such as, for example, packet-based communication) between computer system 1000 and one or more other computer systems 1000 or one or more networks. As an example and not by way of limitation, communication interface 1020 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1020 for it. As an example and not by way of limitation, computer system 1000 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1000 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 can include any suitable communication interface 1020 for any of these networks, where appropriate. Communication interface 1020 can include one or more communication interfaces 1020, where appropriate. Although this disclosure describes and illustrates a particular communication interface, this disclosure contemplates any suitable communication interface.

In some embodiments, bus 1040 includes hardware, software, or both coupling components of computer system 1000 to each other. As an example and not by way of limitation, bus 1040 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1040 can include one or more buses 1004, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A computer-implemented method for generating merchant clusters based upon monitored consumer transaction activity, comprising:
    obtaining, by a processor, transaction activity of consumers;
    generating, by the processor, a reference cluster based on the obtained transaction activity;
    generating, by the processor, at least one regional merchant cluster for each of a plurality of different geographic regions based on the obtained transaction activity;
    determining, by the processor, at least one match score of the at least one regional merchant cluster in the plurality of different geographic regions against the reference cluster thereof;
    generating, by the processor, a reference vector and a regional vector for each of the plurality of different geographic regions;
    generating, by the processor, a cluster labeling scheme, for each of the plurality of different geographic regions, based on comparing each of the regional merchant clusters in that corresponding geographic region against the reference cluster; and
    realigning, by the processor, cluster labels for each of the regional merchant clusters in each of the plurality of different geographic regions based on the corresponding cluster labeling scheme generated for the corresponding geographic region.

2. The computer-implemented method of claim 1, further comprising identifying, by the processor, different geographic regions and merchants in each of the different geographic regions, wherein the merchants identified in each of the different geographic regions are included, by the processor, in one or more corresponding regional merchant clusters for each identified geographic region.

3. The computer-implemented method of claim 1, further comprising determining, by the processor, match scores of different regional merchant clusters for each of the different geographic regions against the reference cluster.

4. The computer-implemented method of claim 3, wherein comparing each regional merchant cluster against the reference cluster further comprises:
    generating, by the processor, a reference vector and a regional vector for each of the different geographic regions, wherein the regional vector comprises match scores of the merchant clusters for each corresponding geographic region;
    performing, by the processor, a dot product of the reference vector and the regional vector for each geographic region to generate a similarity matrix for each geographic region;
    determining, by the processor and from the similarity matrix, the cluster labeling scheme for each geographic region.

5. The computer-implemented method of claim 4, wherein the cluster labeling scheme is determined by identifying, by the processor, the cluster labeling scheme that maximizes the dot product values in the similarity matrix.

6. The computer-implemented method of claim 1, wherein the reference cluster is a country-level merchant cluster generated based on transactions made by consumers within a predetermined time period and wherein the country-level merchant cluster serves as reference for the different regional merchant clusters to be normalized with respect to each other.

7. The computer-implemented method of claim 6, wherein being normalized further comprises realigning, by the processor, cluster labels for each of the different regional merchant clusters with respect to the reference cluster.

8. The computer-implemented method of claim 1, wherein generating at least one regional merchant cluster for each of a plurality of different geographic regions further comprises:
    identifying, by the processor, a parameter affecting shopping behavior of consumers from the obtained transaction activity; and
    generating, by the processor, different regional merchant clusters in each geographic region based on the identified parameter.

9. The computer-implemented method of claim 1, further comprising providing, by the processor and to a consumer, a recommendation of a first merchant at which to shop by determining from the obtained transaction history that the consumer has previously shopped at a second merchant that is a member of a regional merchant cluster comprising the first merchant and the second merchant.

10. The computer-implemented method of claim 1, wherein generating at least one regional merchant cluster further comprises identifying, by the processor, a first merchant and a second merchant located within a geographic region such that one or more consumers have visited both the first and second merchant more than once.

11. An apparatus for generating merchant clusters based upon monitored consumer transaction activity, comprising:
a processor configured to communicate with a consumer transaction database, the processor configured to:
obtain transaction activity of consumers;
generate a reference cluster based on the obtained transaction activity;
generate at least one regional merchant cluster for each of a plurality of different geographic regions based on the obtained transaction activity;
determine at least one match score of the at least one regional merchant cluster in the plurality of different geographic regions against the reference cluster thereof;
generate a reference vector and a regional vector for each of the plurality of different geographic regions;
generate a cluster labeling scheme, for each of the plurality of different geographic regions, based on comparing of the regional merchant clusters in that corresponding geographic region against the reference cluster; and
realign cluster labels for each of the regional merchant clusters in each of the plurality of different geographic regions based on the corresponding cluster labeling scheme generated for the corresponding geographic region.

12. The apparatus of claim 11, wherein the processor is further configured to identify different geographic regions and merchants in each of the different geographic regions, wherein the merchants identified in each of the different geographic regions are included, by the processor, in one or more corresponding regional merchant clusters for each identified geographic region.

13. The apparatus of claim 11, wherein the processor is further configured to determine match scores of different regional merchant clusters for each of the different geographic regions against the reference cluster.

14. The apparatus of claim 13, wherein the processor compares each regional merchant cluster against the reference cluster by further being configured to:
generate a reference vector and a regional vector for each of the different geographic regions, wherein the regional vector comprises match scores of the regional merchant clusters for each corresponding geographic region;
perform a dot product of the reference vector and the regional vector for each geographic region to generate a similarity matrix for each geographic region;
determine, from the similarity matrix, the cluster labeling scheme for each geographic region.

15. The apparatus of claim 14, wherein the cluster labeling scheme is determined by identifying the cluster labeling scheme that maximizes the dot product values in the similarity matrix.

16. The apparatus of claim 11, wherein the reference cluster is a country-level merchant cluster generated based on transactions made by consumers within a defined time period and wherein the country-level merchant cluster serves as reference for the different regional merchant clusters to be normalized with respect to each other.

17. The apparatus of claim 16, wherein being normalized further comprises realignment of cluster labels for each of the different regional merchant clusters with respect to the reference cluster.

18. The apparatus of claim 11, wherein the processor is configured to generate at least one regional merchant cluster for each of a plurality of different geographic regions by further being configured to:
identify a parameter affecting shopping behavior of consumers from the obtained transaction activity; and
generate different regional merchant clusters in each geographic region based on the identified parameter.

19. The apparatus of claim 11, wherein the processor is further configured to provide, to a consumer, a recommendation of a first merchant at which to shop by determining from the obtained transaction history that the consumer has previously shopped at a second merchant that is a member of a regional merchant cluster comprising the first merchant and the second merchant.

20. The apparatus of claim 11, wherein processor is configured to generate at least one regional merchant cluster by further being configured to identify a first merchant and a second merchant located within a geographic region such that one or more consumers have visited both the first and second merchant more than once.

* * * * *